United States Patent [19]

Shinohara

[11] Patent Number: 5,621,302
[45] Date of Patent: Apr. 15, 1997

[54] BATTERY CHARGER MONITORING BATTERY VOLTAGE AND/OR TEMPERATURE AT RELEVANT SAMPLING INTERVAL

[75] Inventor: Shigeru Shinohara, Hitachinaka, Japan

[73] Assignee: Hitachi Koki Co., Ltd., Tokyo, Japan

[21] Appl. No.: 462,267

[22] Filed: Jun. 5, 1995

[30] Foreign Application Priority Data

Jun. 3, 1994 [JP] Japan ................................. 6-122433
Mar. 3, 1995 [JP] Japan ................................. 7-043969

[51] Int. Cl.$^6$ .......................................... H02J 7/00
[52] U.S. Cl. ....................... 320/22; 320/39; 320/24; 320/35; 320/43
[58] Field of Search .......................... 320/20, 21, 22, 320/23, 24, 31, 32, 33, 35, 36, 37, 38, 39, 43

[56] References Cited

U.S. PATENT DOCUMENTS

| | | |
|---|---|---|
| 4,755,735 | 7/1988 | Inakagata . |
| 5,113,128 | 5/1992 | Ohara et al. . |
| 5,268,630 | 12/1993 | Bhagwat et al. ................. 320/20 |
| 5,391,974 | 2/1995 | Shiojima et al. ................. 320/35 |
| 5,410,238 | 4/1995 | Ishizuka et al. ................. 320/22 |
| 5,444,353 | 8/1995 | Shinohara et al. ............... 320/39 |

FOREIGN PATENT DOCUMENTS

| | | |
|---|---|---|
| 3705222A1 | 8/1987 | Germany . |
| 4033119A1 | 4/1991 | Germany . |
| 4123168A1 | 1/1992 | Germany . |
| 4319861A1 | 12/1993 | Germany . |
| 591677 | 4/1993 | Japan ................. H02J 7/10 |

*Primary Examiner*—Peter S. Wong
*Assistant Examiner*—Patrick B. Law
*Attorney, Agent, or Firm*—Sughrue, Mion, Zinn, Macpeak & Seas

[57] ABSTRACT

A charge current to be supplied to a battery is selected depending on a remaining capacity of the battery to be charged and/or an initial temperature of the battery to be charged. A battery voltage or a battery temperature is being monitored and sampled at a relevant sampling interval determined depending on the selected charge current. A difference between two battery voltages or between two battery temperatures at two sampling points is sequentially computed and whether or not the battery has reached a fully charged condition is determined based on the computed results.

20 Claims, 7 Drawing Sheets

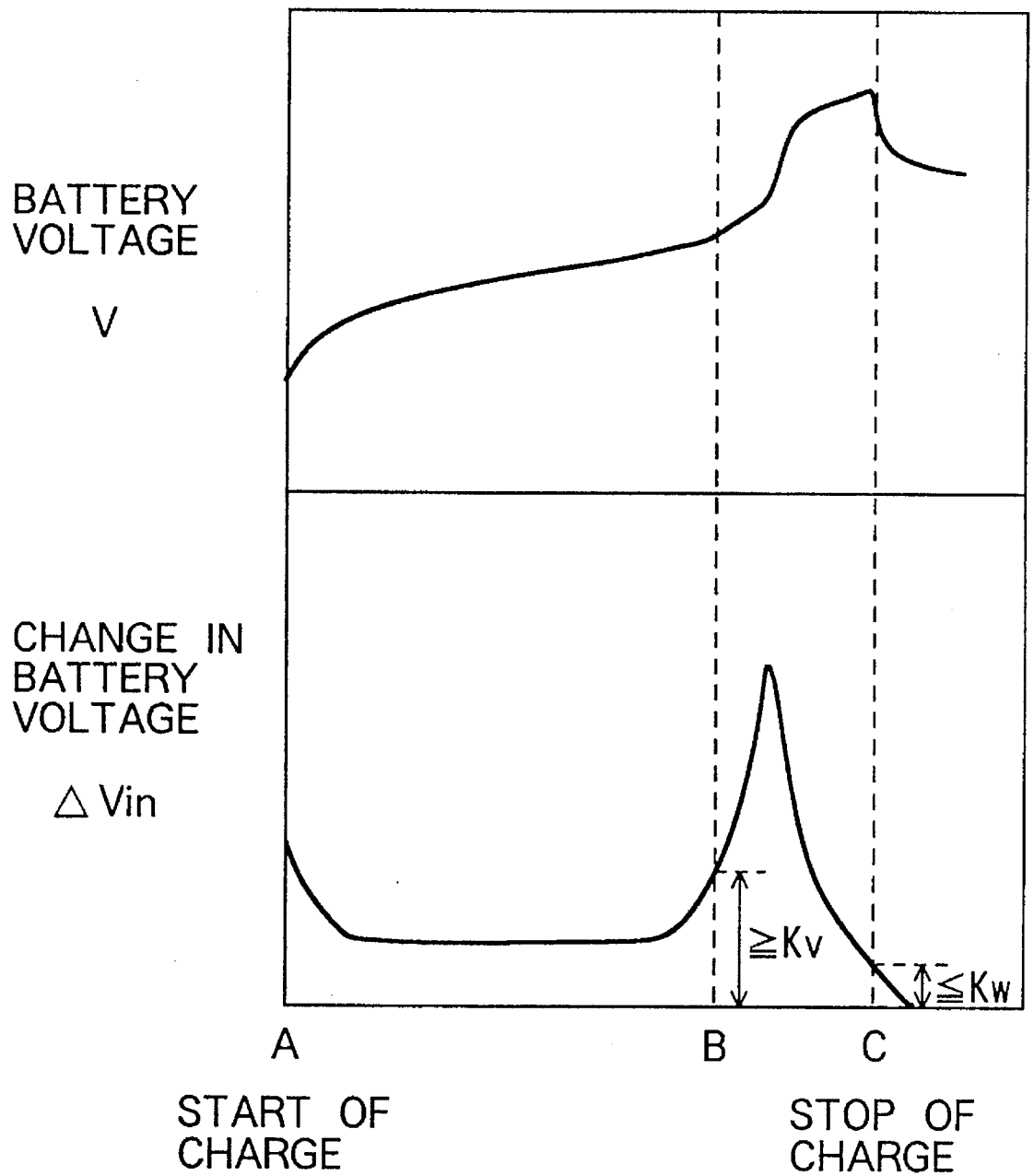

BATTERY CHARGER MONITORING BATTERY VOLTAGE AND/OR TEMPERATURE AT RELEVANT SAMPLING INTERVAL

BACKGROUND OF THE INVENTION

1. Field of the Invention

The present invention relates to a battery charger for charging rechargeable batteries such as nickel-cadmium batteries.

2. Description of the Related Art

In conventional battery chargers, while supplying a constant level of charge current to a battery, a battery voltage or a battery temperature is sampled at every constant interval to detect that a battery has reached a fully charged condition. Japanese Laid-Open Patent Publication (which is A type publication and will be referred to as "OPI publication" hereinafter) Nos. SHO-53-103544 and SHO-54-158641 describe battery chargers that determine whether a battery has reached a fully charged condition based on the battery voltage periodically sampled at every constant interval. OPI Publications Nos. HEI-2-246739 and HEI-6-113475 describe battery chargers that determine full charge of a battery by detecting change in battery temperature while periodically sampling the battery temperature at a constant interval. On the other hand, U.S. Pat. No. 5,410,238 to ISHIZUKA et al proposes changing the level of charge current according to an initial battery temperature. OPI Publication No. HEI-6-6939, which corresponds to copending U.S. application Ser. No. 08/77,051, proposes changing the level of charge current depending on the remaining capacity of the battery to be charged.

Generally, when a battery is charged with a small charge current, for example, with 5C where C is a battery charging rate and represents a charge current required for charging a battery in an hour, the battery voltage and battery temperature change only by a small amount per unit of time as shown in FIG 1A. Contrarily, when a battery is charged with a large charge current, for example, with 8C, the battery voltage and temperature change by a large amount per unit of time as shown in FIG. 1B. The greater the difference between a large and a small charge current, the more pronounced the difference between their charging characteristics, i.e., change in voltage and change in temperature.

When the charge current is changed dependant on change in battery temperature or change in battery voltage as detected by sampling, the smaller the applied charge current, the smaller the change in battery voltage and the change in temperature per unit of time, resulting in a long charging time.

When charging is performed with a small current, battery voltage and battery temperature change only slightly during charging. Therefore, if sampling is performed at a relatively short interval as is done in the case of charging with a large current, the full charge may not be detected despite full charge being actually reached, resulting in overcharge of the battery because charging is unduly continued. On the other hand, charging with a large current increases change in battery voltage and change in battery temperature. Therefore, if sampling is performed at a relatively short interval, the full charge can be accurately detected. However, if sampling is performed at the longer interval used for charging with a small current, full charge may be detected after full charge has actually been achieved, again possibly resulting in an overcharge.

SUMMARY OF THE INVENTION

It is an object of the present invention to overcome the above-described problems and to provide a battery charger that accurately detects full charge of a battery to be charged by monitoring the battery temperature or battery voltage and by comparing a change in the battery temperature or a change in the battery voltage with respective predetermined values.

To achieve the above and other objects, there is provided a battery charger for charging a battery, which includes battery status detecting means for detecting a status of the battery, which may be a remaining capacity of the battery to be charged or an initial temperature of the battery. A charge current selecting means is provided for selecting a charge current to be supplied to the battery from a plurality of different charge currents according to the status of the battery as detected by the battery status detecting means. A battery voltage detecting means is provided for detecting a voltage across the battery and for outputting a detected voltage of the battery. Instead of, or in addition to the battery voltage detecting means, a battery temperature detecting means may be provided for detecting a battery temperature. Sampling means is provided for sampling the detected voltage of the battery or detected temperature of the battery. Sampling interval determining means is further provided for determining, based on the charge current selected by the charge current selecting means, a sampling interval to be posed between successive samplings implemented by the sampling means. Full charge detecting means detects that the battery has reached a fully charged condition based on detected voltages of the battery or detected battery temperature as sampled by the sampling means.

The full charge detecting means includes computing means for computing a difference between two detected voltages of the battery or two detected temperatures of the battery sampled at two sampling points by the sampling means and for outputting a computed result representative of the difference between the two detected voltages of the battery or between the two detected temperatures of the battery, comparison means for comparing the computed result with a predetermined value, and charge terminating means for terminating charge of the battery when the comparison means indicates that the computed result is greater than the predetermined value. The predetermined value is also set based on the charge current selected by the charge current selecting means. The two detected voltages or the two detected temperature of the battery may be those sampled at two successive sampling points. Alternatively, the two detected voltages or the two detected temperature of the battery may be those sampled at two sampling points being apart in time by at least two sampling intervals.

The full charge detecting means may include computing means for computing a difference between two detected voltages of the battery sampled at two sampling points by the sampling means and for sequentially outputting and updating a computed result representative of the difference between the two detected voltages of the battery, first comparison means for comparing the computed result with a first predetermined value, second comparison means, operable only when the first comparison means indicates that the computed result is greater than the first predetermined value, for comparing the computed result with a second predetermined value, and charge terminating means for terminating charge of the battery when the second comparison means indicates that the computed result falls below the second predetermined value.

BRIEF DESCRIPTION OF THE DRAWINGS

The above and other objects, features and advantages of the invention will become more apparent from reading the following description of the preferred embodiment taken in connection with the accompanying drawings in which:

FIG. 7 is a graph showing battery voltage (absolute value) and change in battery voltage from start of battery charge to completion of battery charge.

DETAILED DESCRIPTION OF THE PREFERRED EMBODIMENTS

Figure 1A:
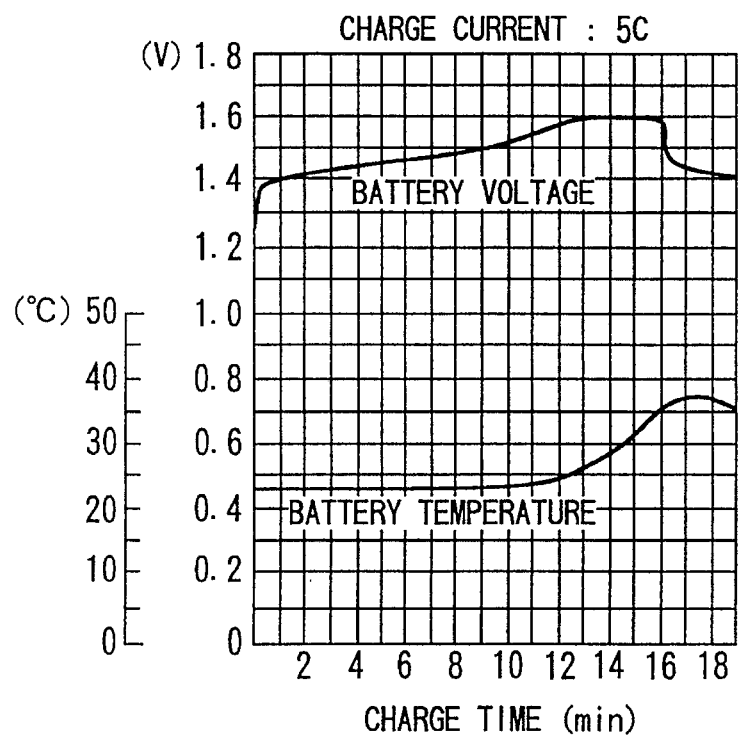
FIG. 1A is a graph showing change in battery voltage and change in battery temperature over time when a battery is charged with a relatively small current.
Figure 1B:
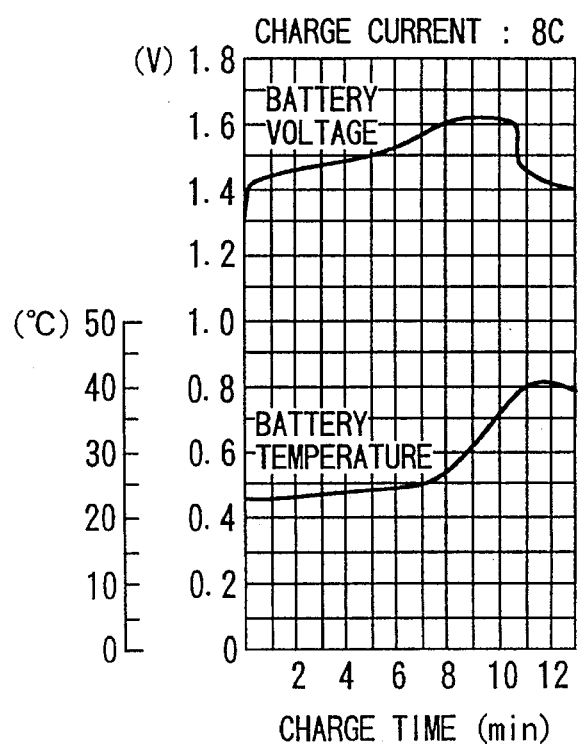
FIG. 1B is a graph showing change in battery voltage and change in battery temperature over time when a battery is charged with a relatively large current.

A battery charger according to a preferred embodiment of the present invention will be described while referring to the accompanying drawings.

To charge a battery 2 with the battery charger shown in FIG. 2, the battery 2 is connected between the output of a rectifying/smoothing circuit 30 (to be described later) and ground. The battery 2 consists of a plurality of cells 2A. A temperature detector 2B is positioned adjacent to or in contact with the battery cells 2A to detect the temperature of the battery 2.

To supply a charge current in the battery 2, a rectifying/smoothing circuit 10, a switching circuit 20 and another rectifying/smoothing circuit 30 are connected in series between an A.C. power source 1 and the battery 2. The rectifying/smoothing circuit 10 is connected to the A.C. power source 1 for converting A.C. voltage to D.C. voltage. The circuit 10 includes a full-wave rectifier 11 and a smoothing capacitor 12. The switching circuit 20 is connected to the output of the rectifying/smoothing circuit 10 and includes a high frequency transformer 21, a MOSFET 22, and a PWM (pulse width modulation) control IC 23. This IC 23 changes the width of driving pulses applied to the MOSFET 22. With the switching actions performed by the MOSFET 22, pulsating voltage is developed at the secondary side of the transformer 21. Another rectifying/smoothing circuit 30 is connected to the output of the switching circuit 20, and includes diodes 31, 32, a choke coil 33, and a smoothing capacitor 34.

A resistor 3 is connected in series to the battery 2, which serves as a current detection means for detecting a charge current flowing in the battery 2. To control the charge current, a charge current control circuit 60 is provided in a feedback path between the resistor 3 and the switching circuit 20. The charge current control circuit 60 includes cascade-connected operational amplifiers 61 and 62, resistors 63 through 67, and a charge current switching means 68 made from, for example, a CMOSIC analog switch 4066.

A battery voltage detection circuit 40 is connected in parallel to the battery 2 and is made up of two resistors 41 and 42 connected in series so that the voltage across the battery 2 is divided with a ratio of resistances of the two resistors.

A single chip microcomputer 50 including a CPU 51, a ROM 52, a RAM 53, a timer 54, an analog-to-digital (A/D) converter 55, an output port 56, and a reset input port 57 which are mutually connected by a bus, is provided for controlling the switching circuit 20 to perform switching action based on the battery voltage and/or battery temperature. The voltage developed across the resistor 42 of the battery voltage detection circuit 40 is applied to the A/D converter 55 to provide the microcomputer 50 with battery voltage information. The temperature detector 2B is also connected to the A/D converter 55 of the microcomputer 50 to provide the microcomputer 50 with battery temperature information.

The microcomputer 50 determines a sampling interval to be posed between successive samplings at which the battery voltage information or battery temperature information is sampled. The sampling interval is determined according to the charge current. The microcomputer 50 also determines a critical value depending on the charge current. The critical value is used to determine full charge of the battery 2. Furthermore, the microcomputer 50 stores the battery temperature or battery voltage, updates the battery temperature or battery voltage each time sampling is performed, and compares at each sampling change in battery voltage or change in battery temperature, that is, the difference between the most recent battery temperature or battery voltage and the battery temperature or voltage obtained at the proceeding sampling, with the respective critical values. The RAM 53 has a battery voltage storage location 531 in which are stored the battery voltages taken during sampling and a battery temperature storage location 532 in which are stored the battery temperatures taken during sampling.

A photocoupler 4 connects the output port 56 of the microcomputer 50 to the PWM control IC 23 of the switching circuit 20 for transmitting instructions regarding start and stop of chargings to the IC 23 from the microcomputer 50. Another photocoupler 5 connects the output of the operational amplifier 62 of the charge current control circuit 60 to the PWM control IC 23 to feed back the charge current as controlled by the charge current control circuit 60.

A constant voltage power supply 70 is provided for supplying constant voltages to the microcomputer 50 and the charge current control circuit 60. The constant voltage power supply 70 includes a transformer 71, a full-wave rectifier 72, a smoothing capacitor 73, a three-terminal voltage regulator 74, and a reset IC 75. The reset IC 75 issues a reset signal to the reset input port 57 of the microcomputer 50 to reset the same.

Next, operations performed by the battery charger according to a first embodiment will be described while referring to FIGS. 2 and 3. The first embodiment detects full charge of a battery 2 based on changes in voltage of the battery 2.

When power is turned ON, the microcomputer 50 prompts the operator to load or connect the battery 2. The microcomputer 50 determines that the battery 2 is connected based on the output from the voltage detection circuit 40 (S101). When the microcomputer 50 determines that the battery 2 is connected ("Yes" in S101), the microcomputer 50 outputs in S102 a charge start signal from its output port 56 to the PWM control IC 23 via the photocoupler 4, thereby starting charging. Simultaneously with start of charging, the resistor 3 detects the charge current flowing through the battery 2 and the charge current control circuit 60 feeds back the difference between a voltage corresponding to the detected charge current and a reference voltage value $V_{ref}$ to the PWM control IC 23 via the photocoupler 5. That is, the width of a driving pulse applied to the gate of the MOSFET 22 is narrowed when a large current is flowing through the battery 2 and widened in the opposite case. Owing to the switching actions performed by the MOSFET 22, a pulse-shaped charge current flows into the rectifying/smoothing circuit 30 where the pulse-shaped charge current is smoothened into a DC current. In this way, a fixed charge current is maintained. That is, the charge current is controlled to be constant by the circuit including the resistor 3, the charge current control circuit 60, the photocoupler 5, the switching circuit 20, and the rectifying/smoothing circuit 30.

Next, whether or not the remaining capacity of the battery 2 is large is determined in S103. To determine the remaining capacity of the battery 2, the battery 2 is subjected to a preliminary charge for a predetermined period of time. Thereafter, the remaining capacity of the battery 2 is determined from the gradient of the battery voltage, that is, from the difference between the battery voltage before charging started and the battery voltage after a predetermined period of time elapses. A small gradient will be interpreted as a small capacity remaining in the battery 2 (i.e., S103 is YES), whereupon the charge current is set in S104 to a large value $I_1$. Also, in S105 the sampling interval t is set to a small value $T_1$ and a critical value $K_V$ is set to a large value $K_{V1}$. The critical value $K_V$ is used to determine the full charge of the battery 2 through comparison with change in battery voltage computed at each sampling. On the other hand, a large gradient will be interpreted as a large capacity remaining in the battery 2 (i.e., S103 is NO), whereupon in S106 the charge current is set to a small value $I_2$ ($I_1>I_2$) and in S107 the sampling interval t is set to a large value $T_2$ ($T_1<T_2$) and the critical value $K_V$ is set to a small value $K_{V2}$ ($K_{V1}>K_{V2}$). The charge current and the sampling interval are set to maintain a virtually inversely proportional relationship, and the charge current and the critical value are set to maintain a virtually proportional relationship.

When the charge current is set to a large value $I_1$, the charge current switching means 68 is turned OFF in response to a signal output from the output port 56 of the microcomputer 50. This lowers the amplification factor in the operational amplifier 61. On the other hand, when the charge current is reduced to a smaller value $I_2$ ($I_1>I_2$), the charge current switching means 68 is turned ON in response to a signal output from the output port 56 of the microcomputer 50. This increases the amplification factor in the operational amplifier 61.

Next, whether or not the battery 2 has reached a fully charged condition is detected from change in battery voltage. The battery voltage detection circuit 40 outputs a voltage indicative of the battery voltage. The A/D converter 55 converts the output $V_{in}$ from the battery voltage detection circuit 40 into a digital signal in S108. Change in battery voltage $\Delta V_{in}$ is computed in S109 by subtracting an immediately previously sampled battery voltage $V_{pre}$ from the presently sampled battery voltage $V_{in}$. Whether or not change in battery voltage $\Delta V_{in}$ is larger than the critical value $K_V$ is determined in S110. When change in battery voltage $\Delta V_{in}$ is less than or equal to the critical value $K_V$ (i.e., S110 is NO), the presently sampled voltage value $V_{in}$ is stored as the previous battery voltage $V_{pre}$ in S111 and, after the predetermined time (t seconds) elapses (i.e., S112 is YES), the processes in S108 through 110 are repeated. If the battery voltage $\Delta V_{in}$ is determined in S110 to be larger than the critical value $K_V$, the microcomputer 50 stops charging processes in S113 by outputting a charge stop signal from its output port 56 to the PWM control IC 23 via the photocoupler 4. Next, whether or not the battery 2 has been removed from battery charger is determined in S114. Once the battery 2 has been removed (i.e., S114 is NO), the program returns to S101 and waits for another battery 2 to be loaded into the battery charger.

Figure 2:
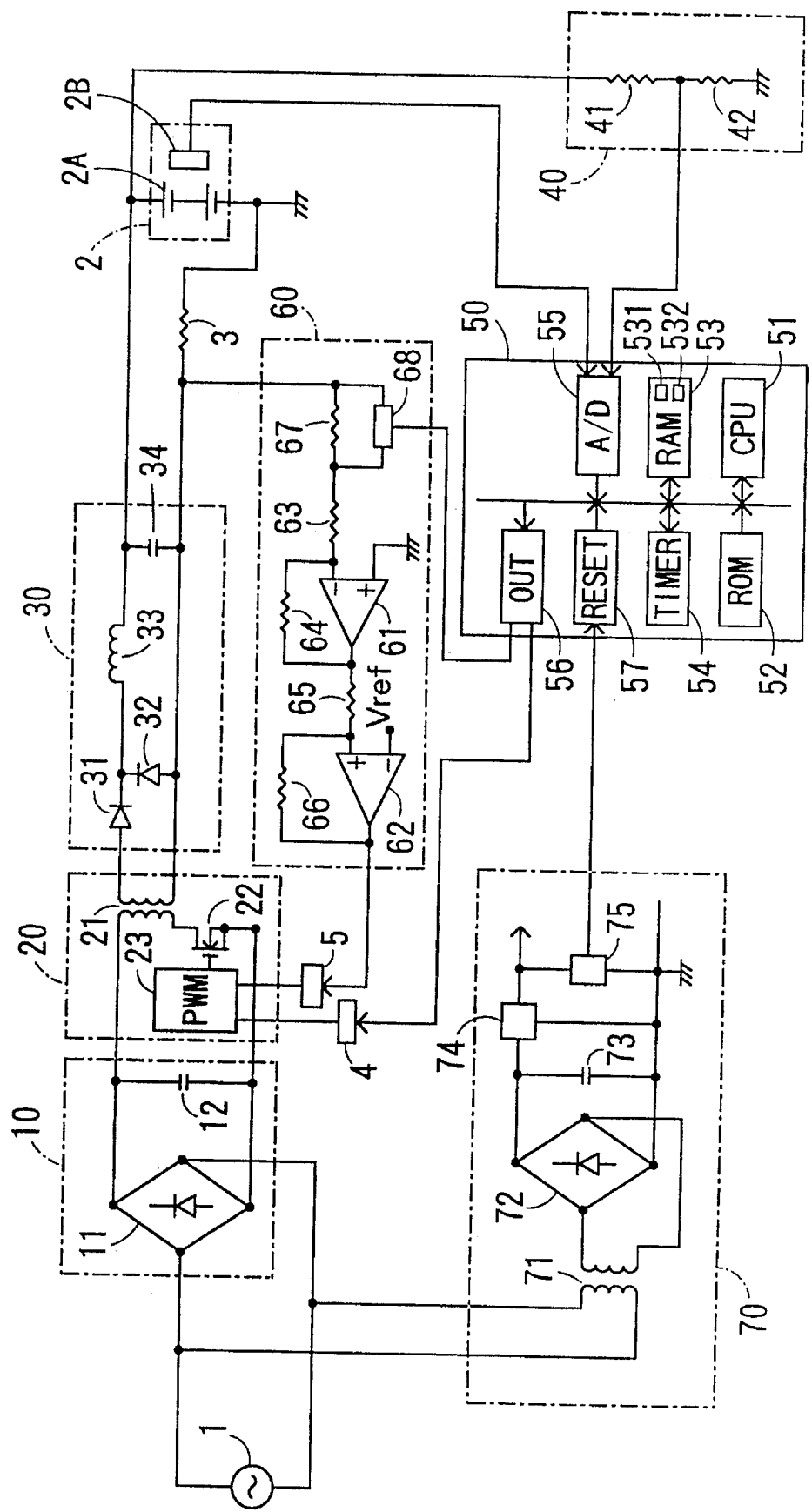
FIG. 2 is a circuit diagram showing interconnection of components of a battery charger according to the present invention.
Figure 4:
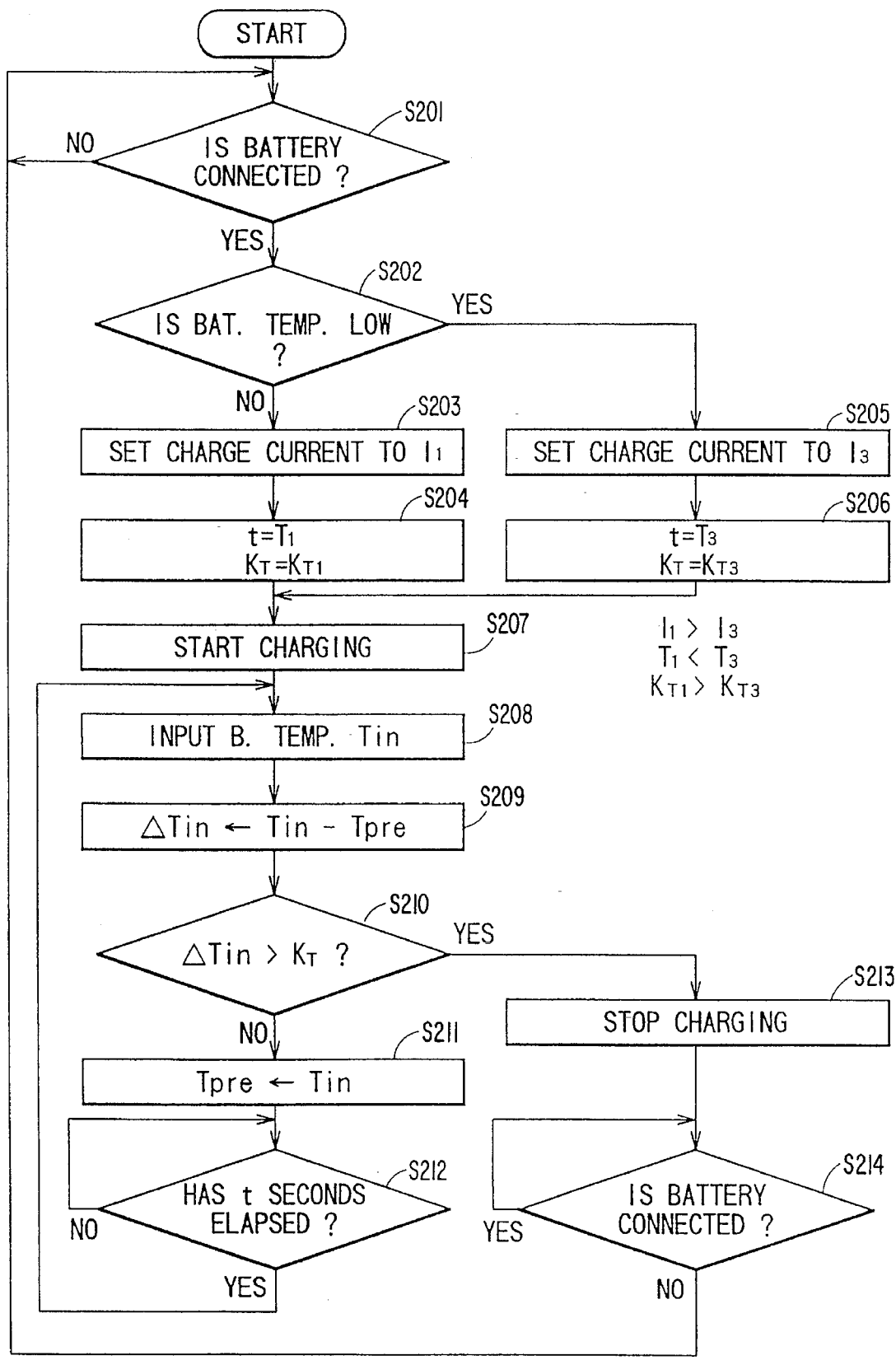
FIG. 4 is a flowchart illustrating a control program for use in conjunction with the battery charger shown in FIG. 2 according to a second embodiment of the present invention.

Next, a description of a second embodiment of the present invention will be provided while referring to FIGS. 2 and 4.

When power is turned ON, the microcomputer 50 prompts the operator to connect the battery 2. When, by referring to the signal output from the voltage detection circuit 40, the microcomputer 50 determines that the battery 2 is connected (i.e., S201 is YES), the program proceeds to S202, where the microcomputer 50 receives the signal from the temperature detector 2B at the A/D converter 55 and determines whether or not the temperature of the battery 2 is low. When the temperature of the battery 2 is not low, in S203 the charge current is set to a high value $I_1$, and in S204 sampling interval t is set to a short value $T_1$ and the value $K_T$ is set to a large value $K_{T1}$ where the value $K_{T1}$ represents a critical value for determining full charge of the battery 2 in terms of change in battery temperature.

On the other hand, when the battery temperature is low, (i.e., S202 is YES), in S205 the charge current is set to a small value $I_3$ ($I_1>I_3$), and in S206 the sampling interval t is set to a longer value $T_3$ ($T_1<T_3$) and the critical value $K_T$ is set to lower value $K_{T3}$ ($K_{T1}>K_{T3}$). Again, the charge current and the sampling interval are set to maintain a virtually inversely proportional relationship, and the charge current and the critical value are set to maintain a virtually proportional relationship.

Next, the microcomputer 50 starts charging in S207 by outputting a charge start signal from its output port 56 to the PWM control IC 23 via the photocoupler 4. Then, the microcomputer 50 detects whether or not the battery 2 is fully charged based on change in battery temperature. To this effect, the signal output from the battery temperature detector 2B is subjected to A/D conversion in the A/D converter 55 and input into the microcomputer 50 as a battery temperature $T_{in}$ in S208. The change in battery temperature $\Delta T_{in}$ is computed in S209 by subtracting a previous battery temperature $T_{pre}$ obtained in the immediately proceeding sampling from the battery temperature $T_{in}$. Whether or not change in battery temperature $\Delta T_{in}$ is larger than the critical value $K_T$ is determined in S210. When change in battery temperature $\Delta T_{in}$ is less than or equal to the critical value $K_T$ (i.e., S210 is NO), the battery temperature $T_{in}$ is stored as the previous battery temperature $T_{pre}$ in S211 and, after the predetermined time (t seconds) elapses (i.e., S212 is YES), the processes in S208 through 210 are repeated. When change in battery temperature $\Delta T_{in}$ is determined in S210 to be larger than the critical value $K_T$, the microcomputer 50 stops charging processes by outputting a charge stop signal from its output port 56 to the PWM control IC 23 via the photocoupler 4 in S213. Next, whether or not the battery 2 has been removed from the battery charger is determined in S214. Once the battery 2 has been removed (i.e., S114 is NO), the program returns to S201 and waits for another battery 2 to be loaded into the battery charger.

Figure 5:
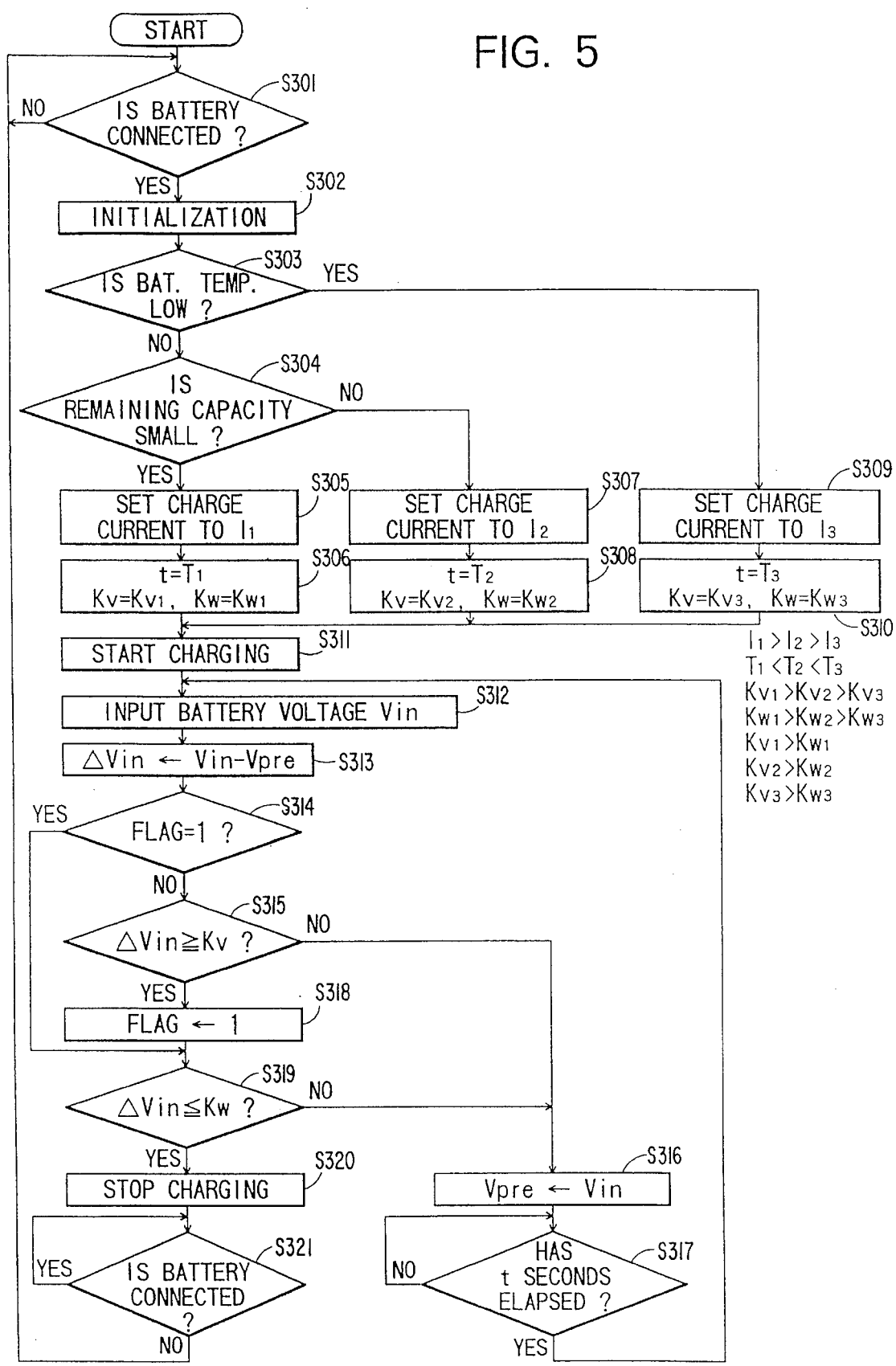
FIG. 5 is a flowchart illustrating a control program for use in conjunction with the battery charger shown in FIG. 2 according to a third embodiment of the present invention.

Next, a description of a third embodiment of the present invention will be provided while referring to the flowchart in FIG. 5. First, the battery voltage curve and its first differential curve representing change in battery voltage $\Delta V_{in}$ will be described while referring to FIG. 7.

In FIG. 7, the letter A indicates the time at which charging is started, the letter B indicates the time at which change in battery voltage $\Delta V_{in}$ starts abruptly increasing, and C indicates the time at which the battery 2 is fully charged so that charging is stopped. Although at time instant B, the charge energy input to the battery 2 was used for conversion of active material in the battery 2, as the battery 2 approaches full charge, the input charge energy starts to be consumed in generation of oxygen at the positive terminals of the battery 2. The internal pressure and temperature of the battery 2 begin to rise, causing the change in battery voltage $\Delta V_{in}$ to increase. At this time instant, the change in battery voltage $\Delta V_{in}$ increases to equal to or greater than the first critical value $K_V$.

As shown in FIG. 7, the change in battery voltage $\Delta V_{in}$ is large at time instant A, that is, when charging is first started, and then gradually drops to a minimum value, which is substantially maintained until time instant B. As the charging process approaches time instant B, the change in battery voltage $\Delta V_{in}$ abruptly increases up to a peak value, and then abruptly decreases until time instant C, where it is equal to or less than the second critical value $K_W$.

The flowchart shown in FIG. 5 represents a program for detecting full charge by monitoring change in battery voltage $\Delta V_{in}$. This program detects full charge by first determining whether or not change in battery voltage $\Delta V_{in}$ is equal to or more than the first critical value $K_V$ and then by detecting that change in battery voltage $\Delta V_{in}$ becomes equal to or falls below the second critical value $K_W$. The first critical value $K_V$ and the second critical value $K_W$ will vary depending on the type of battery 2 to be charged and on the charging environment, but typically these values $K_V$ and $K_W$ are 5 mV and 2.5 mV, respectively, per each cell of the battery 2.

After battery 2 is determined to be loaded in the battery charger in S301, the microcomputer 50 undergoes initialization processes in S302. During initialization, a comparative battery voltage $V_{pre}$ (to be described later) is set to an initial value and a flag FLAG (to be described later) is set to zero or OFF.

Next, in S303, whether or not the temperature of the battery 2 is low is determined. If so (i.e., S303 is YES), the program proceeds to S309 where the charge current is set to a small value $I_3$. Then, the sampling interval t is set to a long value $T_3$ which is determined corresponding to the small charge current $I_3$, the first critical value $K_V$ is set to a small value $K_{V3}$, and the second critical value $K_W$ is set to a small value $K_{W3}$ in S310.

Figure 3:
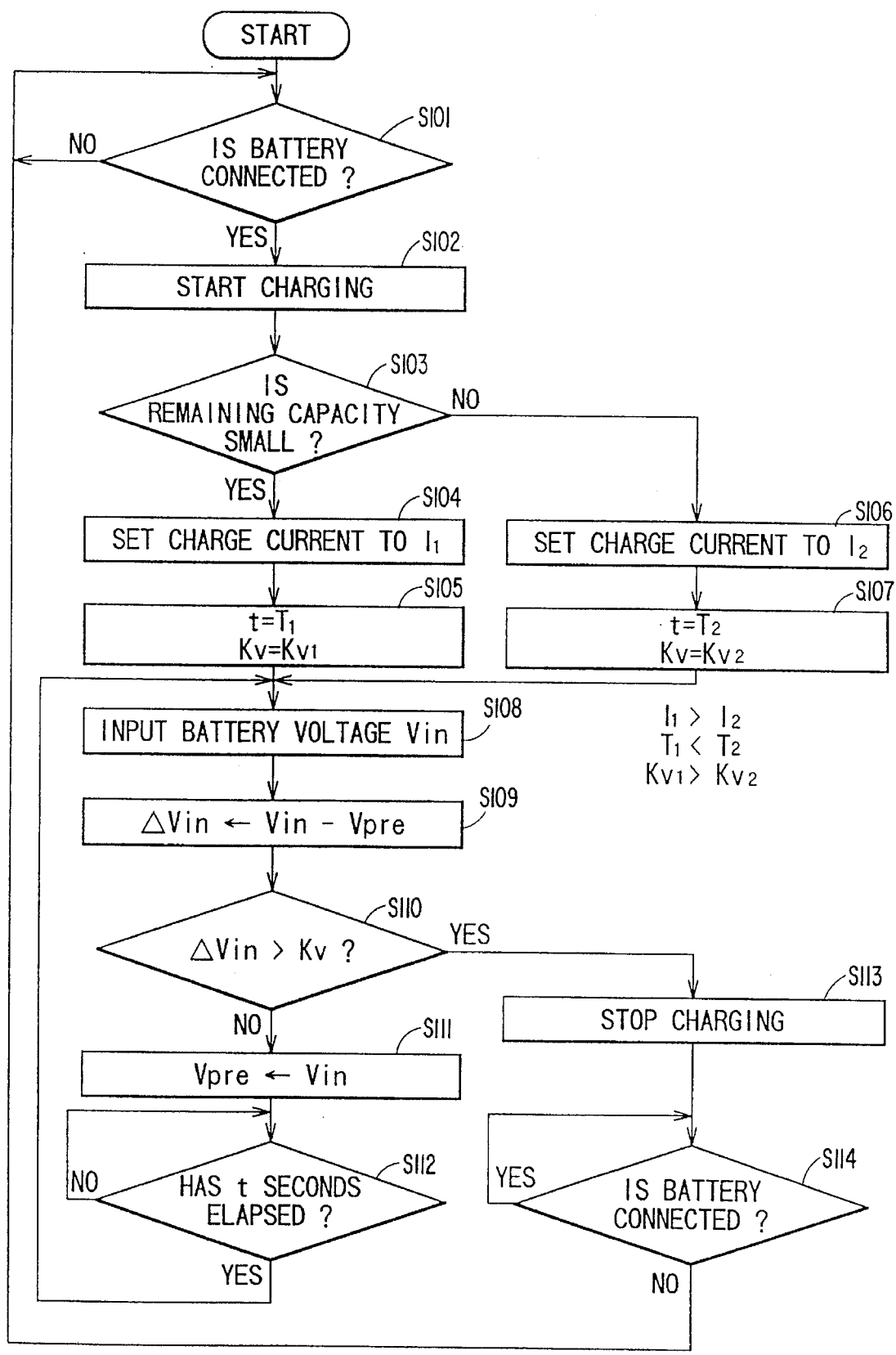
FIG. 3 is a flowchart illustrating a control program for use in conjunction with the battery charger shown in FIG. 2 according to a first embodiment of the present invention.

If the battery 2 is determined in S303 not to be at a low temperature, the program proceeds to S304 where whether or not a small capacity remains in the battery 2 is determined in the same manner as in FIG. 3. To determine the remaining capacity of the battery, the battery 2 is subjected to a preliminary charge as described. If a large capacity remains in the battery 2 (i.e., S304 is NO), the program proceeds to S307 where the charge current is set to an intermediate value $I_2$. Then, the sampling interval t is set to an intermediate value $T_2$ which is determined corresponding to the charge current $I_2$, the first critical value $K_V$ is set to an intermediate value $K_{V2}$, and the second critical value $K_W$ is set to an intermediate value $K_{W2}$ in S308. On the other hand, if only a small capacity remains in the battery 2 (i.e., S304 is YES), the program proceeds to S305 where the charge current is set to a large value $I_1$. Next, in S306, the sampling interval t is set to a short value $T_1$ which is determined corresponding to the charge current $I_1$, the first critical value $K_V$ is set to a large $K_{V1}$, and the second critical value $K_W$ is set to a large value $K_{W1}$. The relationship of these values is summarized below:

$I_1 > I_2 > I_3$;

$T_1 < T_2 < T_3$;

$K_{V1} > K_{V2} > K_{V3}$;

$K_{W1} > K_{W2} > K_{W3}$; and $K_{Vi} > K_{Wi}$.

The charge current and the sampling interval are maintained at a virtually inversely proportional relationship. The charge current and the first and second critical values are maintained at a virtually proportional relationship.

Whether or not the time instant B has been passed is determined in S314 by determining whether or not the flag FLAG is set to one or ON. When the flag FLAG is set to zero meaning that the time instant B has not been passed (i.e., S314 is NO), the program proceeds to S315 where whether or not change in battery voltage $\Delta V_{in}$ is equal to or greater than the first critical value $K_V$ is determined. When the flag FLAG is set to one so that it is determined that time instant B has been passed (i.e., S314 is YES), the program proceeds directly to S319 where whether or not change in battery voltage $\Delta V_{in}$ is equal to or greater than the second critical value $K_W$ is determined.

If it is determined in S315 that change in battery voltage $\Delta V_{in}$ is equal to or greater than the first critical value $K_V$, the program proceeds to S318 where the flag FLAG is set to one. On the other hand, if change in battery voltage $\Delta V_{in}$ is less than the first critical value $K_V$, the program proceeds to S316 where the comparative battery voltage $V_{pre}$ is replaced with the present battery voltage $V_{in}$. Then, after the sampling interval (t seconds) has elapsed as determined in S317, the program returns to S312. If it is determined in S319 that change in battery voltage $\Delta V_{in}$ is equal to or less than the second critical value $K_W$, the program proceeds to S320 where charging is stopped. If change in battery voltage $\Delta V_{in}$ is larger than the second critical value $K_W$ (i.e., S319 is NO), the program proceeds to S316 where the comparative battery voltage $V_{pre}$ is replaced with the present battery voltage $V_{in}$ as described above.

Three different charge currents can be produced using the structure shown in FIG. 2 modified by, for example, addition of an extra combination of resistor 67 and charge current switch means 68. The three different charge currents result from ON and OFF combinations of the switch means 68.

Figure 6:
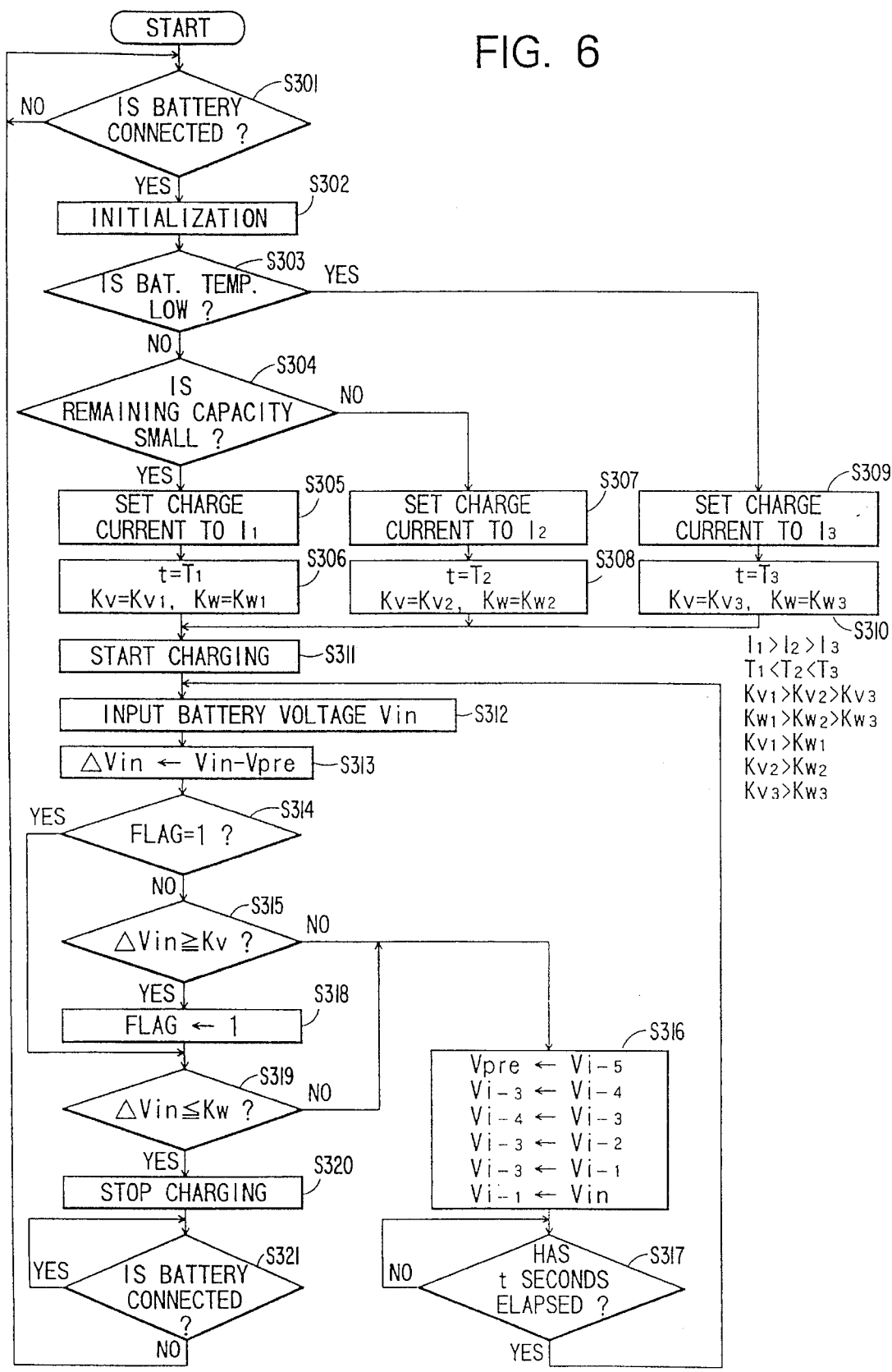
FIG. 6 is a flowchart illustrating a control program for use in conjunction with the battery charger shown in FIG. 2 according to a modification of the third embodiment.

While exemplary embodiments of this invention have been described in detail, those skilled in the art will recognize that there are many possible modifications and variations which may be made in these exemplary embodiments while yet retaining many of the novel features and advantages of the invention. For example, in the embodiments described, change in battery voltage is defined as a difference between the presently sampled battery voltage and the battery voltage obtained at the immediately proceeding sampling. However, a modification is possible in which change in battery voltage is computed from the presently sampled battery voltage and the battery voltage sampled at a previous sampling point that precedes several sampling points to the present sampling point. FIG. 6 is a flowchart including such a modification. The flowchart of FIG. 6 is identical to that of FIG. 5 except for the process in S316. In the modification, six previous battery voltages $V_{i-1}$ to $V_{i-5}$ have been stored in the battery voltage storage location 531, and when the battery voltage $V_{in}$ is detected at each sampling, the contents in the battery voltage storage location 531 are rewritten to the most recent six battery voltages. That is, the presently detected battery voltage is now stored as a voltage $V_{i-1}$, and the voltages which have been stored as $V_{i-1}$ to $V_{i-5}$ are now shifted to $V_{i-2}$ to $V_{pre}$, respectively. When the succeeding battery voltage is detected at the following sampling, change in battery voltage is computed from the voltage $V_{pre}$ and the newly detected battery voltage. By doing so, change in battery voltage increases and therefore the change in battery voltage is available even when the battery is charged with a small current.

Although in the second embodiment the charge current was determined depending on whether the battery 2 was at a low temperature, the charge current could be set based on a determination of whether a large or small capacity remains in the battery.

According to the present invention, when a battery is being charged with a small current, the samples are taken less frequently (i.e., sampling interval is prolonged) and the critical value for determining the full charge of the battery through comparison with change in battery voltage or change in battery temperature is decreased. On the other hand, when a battery is being charged with a large current, the sampling interval is shortened and the critical value is increased. Therefore, change in battery voltage or change in battery temperature can be accurately detected with good response. Therefore, full charge can be accurately detected.

What is claimed is:

1. A battery charger for charging a battery, comprising:

battery status detecting means for detecting a status of the battery;

charge current selecting means for selecting, according to the status of the battery as detected by said battery status detecting means, a charge current to be supplied to the battery from a plurality of different charge currents;

battery voltage detecting means for detecting a voltage across the battery and for outputting a detected voltage of the battery;

sampling means for sampling the detected voltage of the battery;

sampling interval determining means for determining, based on the charge current selected by said charge current selecting means, a sampling interval to be posed between successive samplings implemented by said sampling means, the sampling interval determined by said sampling interval determining means and the charge current selected by said charge current selecting means being substantially in an inversely proportional relationship;

charging means for charging the battery with the charge current selected by said charge current selecting means throughout a charging process until a fully charged condition is reached; and full charge detecting means for detecting that the battery has reached the fully charged condition based on detected voltages of the battery as sampled by said sampling means.

2. A battery charger according to claim 1, wherein said battery status detecting means comprises remaining capacity detecting means for detecting a remaining capacity of the battery, and wherein said charge current selecting means selects the charge current according to the remaining capacity of the battery detected by said remaining capacity detecting means.

3. A battery charger according to claim 2, wherein the remaining capacity of the battery is detected based on an increase of the detected voltage of the battery during a predetermined period of time from a start of charge.

4. A battery charger for charging a battery, comprising:

battery status detecting means for detecting a status of the battery;

charge current selecting means for selecting, according to the status of the battery as detected by said battery status detecting means, a charge current to be supplied to the battery from a plurality of different charge currents;

battery voltage detecting means for detecting a voltage across the battery and for outputting a detected voltage of the battery;

sampling means for sampling the detected voltage of the battery;

sampling interval determining means for determining, based on the charge current selected by said charge current selecting means, a sampling interval to be posed between successive samplings implemented by said sampling means; and full charge detecting means for detecting that the battery has reached a fully charged condition based on detected voltages of the battery as sampled by said sampling means;

wherein said full charge detecting means comprises computing means for computing a difference between two detected voltages of the battery sampled at two sampling points by said sampling means and for outputting a computed result representative of the difference between the two detected voltages of the battery, comparison means for comparing the computed result with a predetermined value, and charge terminating means for terminating charge of the battery when said comparison means indicates that the computed result is greater than the predetermined value.

5. A battery charger according to claim 4, wherein said computing means computes said difference between two detected voltages of the battery sampled at two successive sampling points.

6. A battery charger according to claim 4, wherein said computing means computes said difference between two detected voltages of the battery sampled at two sampling points being apart in time by at least two sampling intervals.

7. A battery charger according to claim 4, wherein the predetermined value is set based on the charge current selected by said charge current selecting means.

8. A battery charger for charging a battery, comprising:

battery status detecting means for detecting a status of the battery;

charge current selecting means for selecting, according to the status of the battery as detected by said battery status detecting means, a charge current to be supplied to the battery from a plurality of different charge currents;

battery voltage detecting means for detecting a voltage across the battery and for outputting a detected voltage of the battery;

sampling means for sampling the detected voltage of the battery;

sampling interval determining means for determining, based on the charge current selected by said charge current selecting means, a sampling interval to be posed between successive samplings implemented by said sampling means; and full charge detecting means for detecting that the battery has reached a fully charged condition based on detected voltages of the battery as sampled by said sampling means;

wherein said full charge detecting means comprises:

computing means for computing a difference between two detected voltages of the battery sampled at two sampling points by said sampling means and for sequentially outputting and updating a computed result representative of the difference between the two detected voltages of the battery;

first comparison means for comparing the computed result with a first predetermined value;

second comparison means, operable only when said first comparison means indicates that the computed result is greater than the first predetermined value, for comparing the computed result with a second predetermined value; and charge terminating means for terminating charge of the battery when said second comparison means indicates that the computed result falls below the second predetermined value.

9. A battery charger according to claim 8, wherein said computing means computes said difference between two detected voltages of the battery sampled at two successive sampling points.

10. A battery charger according to claim 8, wherein said computing means computes said difference between two detected voltages of the battery sampled at two sampling points being apart in time by at least two sampling intervals.

11. A battery charger according to claim 8, wherein the first predetermined value and the second predetermined value are set based on the charge current selected by said charge current selecting means.

12. A battery charger for charging a battery, comprising:

battery status detecting means for detecting a status of the battery;

charge current selecting means for selecting, according to the status of the battery as detected by said battery status detecting means, a charge current to be supplied to the battery from a plurality of different charge currents;

battery temperature detecting means for detecting a temperature of the battery and for outputting a detected temperature of the battery;

sampling means for sampling the detected temperature of the battery;

sampling interval determining means for determining, based on the charge current selected by said charge current selecting means, a sampling interval to be posed between successive samplings implemented by said sampling means, the sampling interval determined by said sampling interval determining means and the charge current selected by said charge current selecting means being substantially in an inversely proportional relationship;

charging means for charging the battery with the charge current selected by said charge current selecting means throughout a charging process until a fully charged condition is reached; and full charge detecting means for detecting that the battery has reached the fully charged condition based on detected temperature of the battery as sampled by said sampling means.

13. A battery charger according to claim 12, wherein the status of the battery is a temperature of the battery before charging.

14. A battery charger according to claim 12, wherein said full charge detecting means comprises computing means for computing a difference between two detected temperatures of the battery sampled at two sampling points by said sampling means and for outputting a computed result representative of the difference between the two detected temperatures of the battery, comparison means for comparing the computed result with a predetermined value, and charge terminating means for terminating charge of the battery when said comparison means indicates that the computed result is greater than the predetermined value.

15. A battery charger according to claim 14, wherein said computing means computes said difference between two detected temperatures of the battery sampled at two successive sampling points.

16. A battery charger according to claim 14, wherein said computing means computes said difference between two detected temperatures of the battery sampled at two sampling points being apart in time by at least two sampling intervals.

17. A battery charger for charging a battery, comprising:

battery status detecting means for detecting a status of the battery;

charge current selecting means for selecting, according to the status of the battery as detected by said battery status detecting means, a charge current to be supplied to the battery from a plurality of different charge currents;

battery temperature detecting means for detecting a temperature of the battery and for outputting a detected voltage of the battery;

sampling means for sampling the detected temperature of the battery;

sampling interval determining means for determining, based on the charge current selected by said charge current selecting means, a sampling interval to be posed between successive samplings implemented by said sampling means; and full charge detecting means for detecting that the battery has reached a fully charged condition based on detected temperature of the battery as sampled by said sampling means;

wherein said full charge detecting means comprising computing means for computing a difference between two detected temperatures of the battery sampled at two sampling points by said sampling means and for outputting a computed result representative of the difference between the two detected temperatures of the battery, comparison means for comparing the computed result with a predetermined value, and charge terminating means for terminating charge of the battery when said comparison means indicates that the computed result is greater than the predetermined value;

wherein the predetermined value is set based on the charge current selected by said charge current selecting means.

18. A battery charger for charging a battery, comprising:

battery status detecting means for detecting a status of the battery;

charge current selecting means for selecting, according to the status of the battery as detected by said battery status detecting means, a charge current to be supplied to the battery from a plurality of different charge currents;

charging progress detecting means for detecting a charging progress of the battery and for outputting a detecting signal indicative of the charging progress of the battery;

sampling means for sampling the detection signal;

sampling interval determining means for determining, based on the charge current selected by said charge current selecting means, a sampling interval to be posed between successive samplings implemented by said sampling means, the sampling interval determined by said sampling interval determining means and the charge current selected by said charge current selecting means being substantially in an inversely proportional relationship;

charging means for charging the battery with the charge current selected by said charge current selecting means throughout a charging process until a fully charged condition is reached; and full charge detecting means for detecting that the battery has reached the fully charged condition based on the detection signal as sampled by said sampling means.

19. A battery charger according to claim 18, wherein said battery status detecting means comprises remaining capacity detecting means for detecting a remaining capacity of the battery, and wherein said charge current selecting means selects the charge current according to the remaining capacity of the battery detected by said remaining capacity detecting means.

20. A battery charger according to claim 19, wherein the remaining capacity of the battery is detected based on an increase of the detected voltage of the battery during a predetermined period of time from a start of charge.

* * * * *